June 12, 1951  J. OSWALD  2,556,775
WINDOW MOUNTING
Filed June 26, 1948
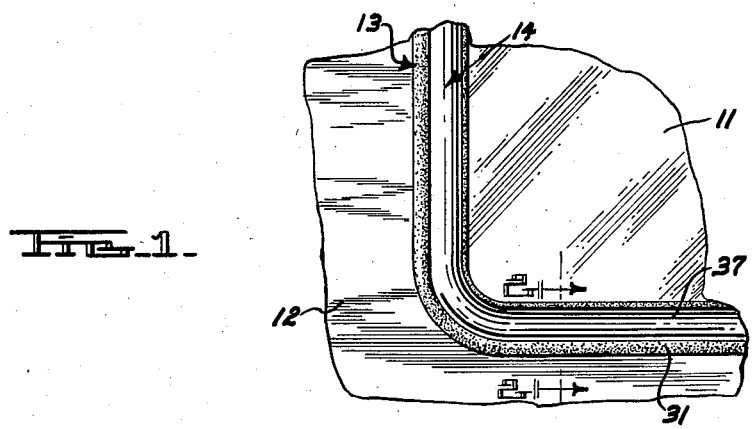
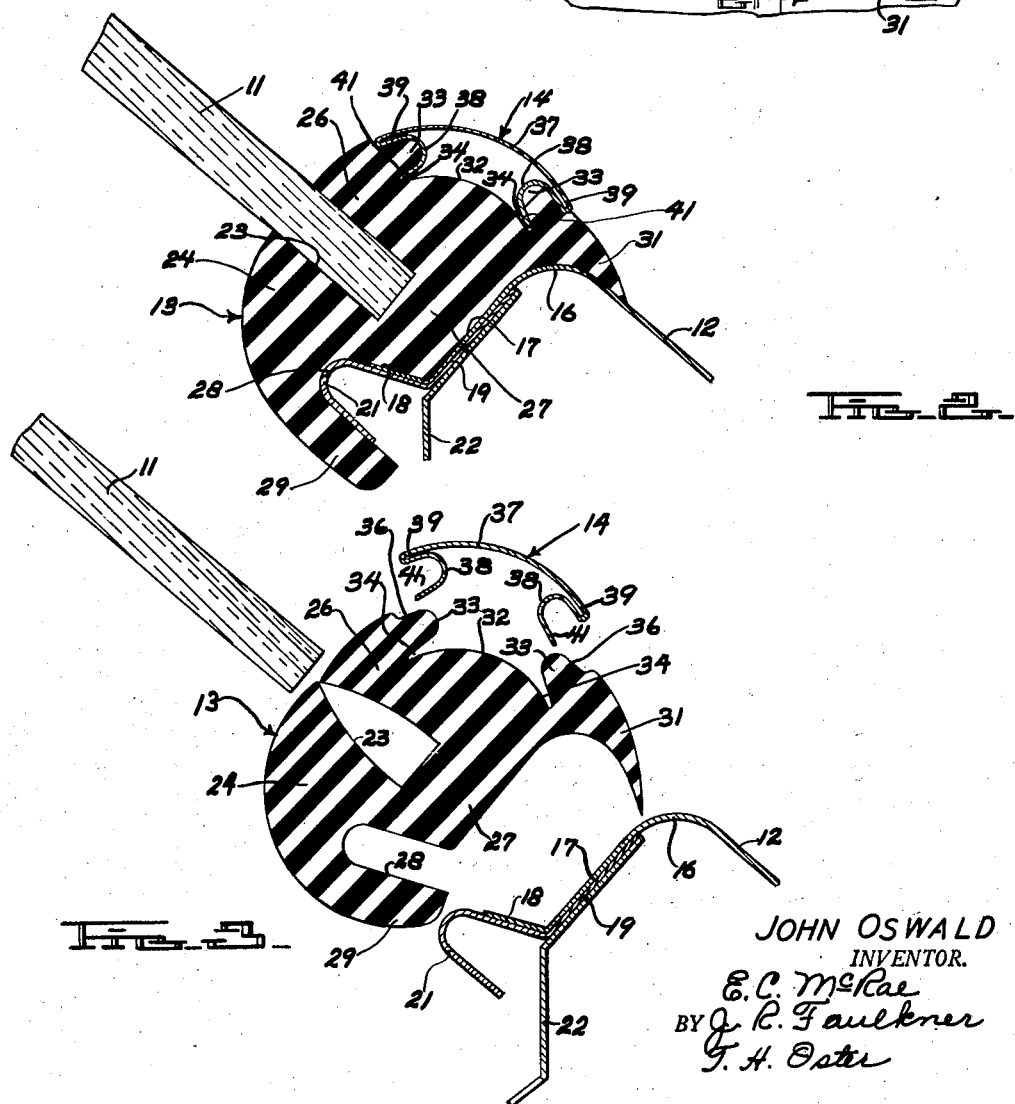
JOHN OSWALD
INVENTOR.
E. C. McRae
BY J. R. Faulkner
G. H. Oster
ATTORNEYS Patented June 12, 1951

2,556,775

UNITED STATES PATENT OFFICE 2,556,775

WINDOW MOUNTING

John Oswald, Detroit, Mich., assignor to Ford Motor Company, Dearborn, Mich., a corporation of Delaware Application June 26, 1948, Serial No. 35,422

2 Claims. (Cl. 296—44)

This invention relates generally to a window mounting, and has particular reference to a weatherstrip and molding assembly for fixedly mounting a window in a vehicle.

It is an object of the present invention to provide a window mounting for a fixed vehicle window which is economical to manufacture, may be assembled with a minimum of time and effort, and will form a weathertight seal between the vehicle body and the window. A further object is to provide a window mounting incorporating a decorative trim molding, such as a chrome plated metal molding, in such manner as to form a unitary assembly in which the trim molding is easily yet permanently mounted without the necessity of providing separate fastening elements for securing the molding in place. In a preferred embodiment of the invention the window mounting comprises a deformable rubber weatherstrip preformed in such manner that it will snugly engage the window glass and the window frame and vehicle body to form weathertight connections therewith. The exterior surface of the rubber weatherstrip is provided with a groove of such shape as to receive and retain a decorative metal trim molding. The molding may be inserted in the groove in the weatherstrip prior to assembly of the weatherstrip to the windshield and vehicle body, and is securely held in place in such manner as to prevent inadvertent disengagement of the trim molding from the weatherstrip. The molding and weatherstrip are such that the exterior surface of the trim molding forms a smooth continuation of the surface of the weatherstrip and presents a pleasing appearance.

Other objects and advantages of the present invention will be made more apparent as this description proceeds, particularly when considered in connection with the accompanying drawings, in which:

Figure 1 is an elevational view of a portion of a window mounted in a vehicle body panel in accordance with the present invention.

Figure 2 is an enlarged cross sectional view taken substantially on the plane indicated by line 2—2 of Figure 1.

Figure 3 is an exploded cross sectional view similar to Figure 2 but showing the various parts disassembled.

While the window mounting of the present invention may be utilized in connection with various types of installations, for the purposes of illustration it is shown as applied to the rear window of an automotive vehicle.

Referring particularly to Figure 1, the reference character 11 indicates a rear window mounted in the roof panel 12 of a vehicle body by means of a weatherstrip 13 formed of elastic deformable material such as rubber. A decorative metal trim molding 14 is carried by the weatherstrip 13, and it will be seen from the elevational view shown in Figure 1, that the trim molding, which may be chrome plated for decorative purposes, covers a substantial portion of the exposed part of the weatherstrip 13 and lends a pleasing appearance to the assembly.

With reference now to Figure 2, it will be seen that the portion of the roof panel 12 below the window is inclined upwardly and is connected by a radius 16 with a flange 17 extending inwardly at right angles to the plane of the window glass 11. The inner edge of the flange 17 is bent upwardly to form an inclined marginal flange 18. A metal window frame is provided and is formed with an outer flange 19 telescopically receiving the flange 17 of the roof panel and with an inverted U-shaped portion 21 at its inner side. The body assembly at this point is completed by a package tray panel 22 which is spot-welded to the window frame and the roof panel to form a rigid construction.

The rubber weatherstrip 13 may be formed by well-known extruding or molding processes and may readily be cut from a continuous strip to the necessary length for the particular window opening. In cross section the weatherstrip is generally U-shaped and is formed with a longitudinal groove 23 between inner and outer wing portions 24 and 26 respectively. A connecting portion 27 remains between the wing portions 24 and 26. The inner wing portion 24 of the weather strip is formed with a longitudinally extending groove 28 spaced from the inner side of the weatherstrip to form a flexible marginal flange 29. It will be apparent that the groove 23 is adapted to receive the edge of the window glass 11 while the groove 28 is provided to embrace the inverted U-shaped portion 21 of the window frame. It will also be seen that in the free position of the weatherstrip, as shown in Figure 3, the grooves are of such size that the weatherstrip must be expanded to receive the window and window frame respectively. A weathertight fit is thus assured.

The outer wing 26 of the weatherstrip is formed with an outwardly extending tapered flange 31 which is curved inwardly in its free position so that it will snugly engage the adjacent surface of the roof panel 12 when assembled therewith, The outer wing portion 26 is also provided with an elongated groove 32 in its outer surface to receive the trim molding 14. It will be seen that longitudinally extending ribs 33 are provided in the rubber adjacent opposite sides of the groove 32 and form undercut grooves 34 in the opposite corners of the groove. The ribs 33 are offset inwardly from the surface of the wing portion 26 of the weatherstrip to form shallow grooves 36 at the surface of the weatherstrip, for a purpose to be pointed out later.

The decorative metal trim molding 14 is formed with an arcuate outer shell of such shape as to conform to the curvature of the exposed portion of the weatherstrip and to form a smooth continuation thereof in the assembled position of the trim molding with the weatherstrip. Return bent U-shaped flanges 38 are formed at opposite sides of the arcuate shell portion 37 of the molding, being joined therewith by rolled edges 39 of double thickness. The free legs 41 of the U-shaped flanges 38 diverge with respect to the double thickness edges 39 to facilitate the assembly of the trim molding with the weatherstrip.

The various parts of the window mounting are assembled as follows: The weatherstrip 13 is first flexed about the connecting portion 27 to spread the window receiving groove 23 sufficiently to receive the outer marginal edge of the window glass 11 therein. When released, the weatherstrip tightly embraces opposite sides of the window glass. The metal trim molding 14 is next assembled to the weatherstrip. This is accomplished by slipping the U-shaped flange 38 of the trim molding located nearest the window glass over the adjacent rib 33 of the weatherstrip. The flange 38 and the rib 33 are generally of complementary shape so that they fit together with the marginal flange 41 of the trim molding being received within the undercut groove 34 in the weatherstrip. Next, the tapered flange 31 of the weatherstrip is bent outwardly to enlarge the opening between the rib 33 so that the marginal flange 41 at the opposite side of the trim molding may be slipped past the adjacent rib 33 into the undercut groove 34. When the flange 31 is released, the ribs 33 of the weatherstrip interlock with the U-shaped flanges 38 of the trim molding.

The resulting assembly of window glass, weatherstrip, and trim molding is then inserted into the window opening of the body from the exterior of the vehicle. This is accomplished by bending the inner marginal flange 29 of the weatherstrip inwardly so that it will clear the U-shaped portion 21 of the window frame and then sliding the assembly inwardly along the flange 17 of the roof panel. When the marginal flange 29 is released it snugly engages the U-shaped portion 21 of the window frame. At the same time the outer tapered flange 31 of the weatherstrip tightly engages the adjacent surface of the roof panel 12. The resultant assembly is shown in Figure 2, and it will be seen that weatherstrip 13 forms a weathertight connection between the window glass 11 and the roof panel 12 and window frame connected thereto. It will be noted that the decorative trim molding 14, in the assembled position shown in Figure 2, is tightly held in place in the weatherstrip and cannot become inadvertently disengaged therefrom, but can only be removed after the entire assembly has been removed from the vehicle body. The double thickness edges 39 of the molding are received within the shallow grooves 36 at opposite sides of the elongated groove 32 in the weatherstrip so that exterior surface of the molding forms a smooth continuous surface with the outer surface of the weatherstrip and provides a pleasing appearance.

It will be apparent from the foregoing that the window mounting of the present invention involves a minimum of parts and hence may be economically manufactured. In addition, the window may be easily mounted in the vehicle by one man, thus effecting a considerable saving of labor over previous types of devices. Furthermore, the decorative trim molding is held in place in such manner that it cannot become disengaged therefrom, and without the necessity of providing additional fastening elements. It will be apparent that while the flexing of the weatherstrip while being assembled to the windshield and to the roof panel and window frame results in clamping the trim molding in place, the molding, since it is assembled to the weatherstrip before the latter is mounted in the vehicle body, is merely carried by the weatherstrip and does not serve as a wedge to spread the weatherstrip. Obviously, the embodiment shown may be changed to fit other types of window mountings and may be used in other installations, and the trim molding may be placed upon the interior of the body as well as on the exterior as shown.

Although I have shown and described certain embodiments of the invention, it will be understood that I do not wish to be limited to the exact construction shown and described, but that various changes and modifications may be made without departing from the spirit and the scope of my invention, as defined in the appended claims.

What is claimed is:

1. In a window mounting for supporting a glass pane in a vehicle window frame, an elongated deformable weatherstrip having a groove formed in the inner edge thereof for receiving said glass pane and a second groove formed in the outer edge thereof for receiving the inner marginal portion of said window frame, said weatherstrip being formed in its free position with said first and second grooves partially collapsed, a third groove in the outer side of said weatherstrip intermediate said first and second grooves and having inwardly projecting ribs at opposite sides thereof, and a rigid sheet metal decorative trim molding adapted to be seated in said third groove, said rigid molding having an exposed body portion and inwardly extending side flanges interlocking with said ribs, the side flanges of said molding being generally U-shaped with their open sides facing outwardly away from each other and engaging the ribs projecting inwardly from the sides of the groove in the weatherstrip.

2. In a window mounting for supporting a glass pane in a vehicle window frame, an elongated deformable weatherstrip having a groove formed in the inner edge thereof for receiving said glass pane and a second groove formed in the outer edge thereof for receiving the inner marginal portion of said window frame, said weatherstrip being formed in its free position with said first and second grooves partially collapsed, a third groove in the outer side of said weatherstrip intermediate said first and second grooves and having inwardly projecting ribs at opposite sides thereof, said ribs being spaced inwardly from the peripheral surface of the weatherstrip to form shallow depressions in said peripheral surface adjacent the sides of said third groove, and a rigid sheet metal decorative trim molding adapted to be seated in said third groove with the edge portions of the exposed body portion of the molding being seated in said shallow depressions so that the outer surface of said edge portions are flush with the outer surface of said weather strip.

JOHN OSWALD.

REFERENCES CITED

The following references are of record in the file of this patent:

UNITED STATES PATENTS

| Number | Name | Date |
|---|---|---|
| 1,487,748 | Maise | Mar. 25, 1924 |
| 2,186,937 | Lohrman | Jan. 16, 1940 |
| 2,189,137 | Eichner | Feb. 6, 1940 |
| 2,189,138 | Eichner | Feb. 6, 1940 |
| 2,454,975 | Pelley | Nov. 20, 1948 |